July 31, 1956     A. E. ROCKEY     2,756,974
BEVERAGE MIXER
Filed April 27, 1953
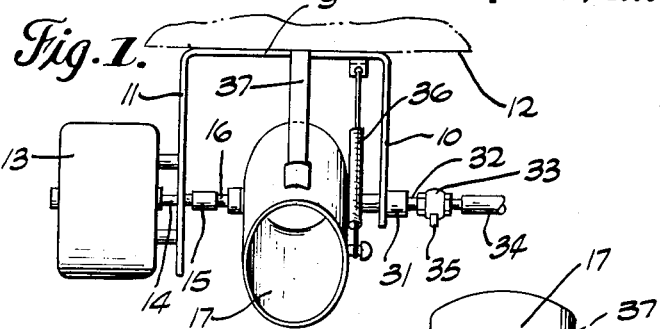
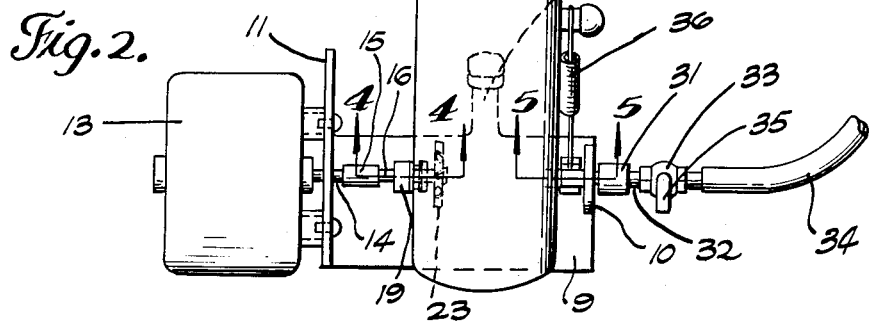
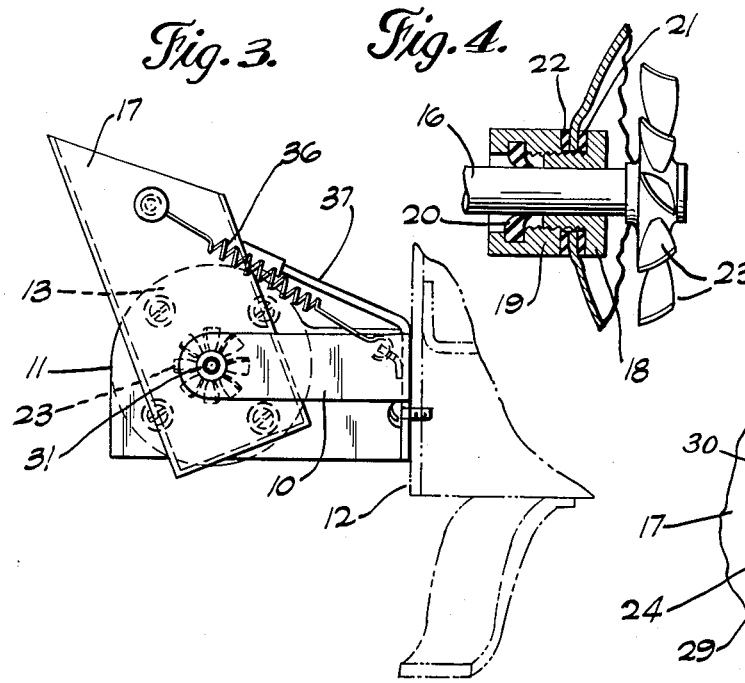
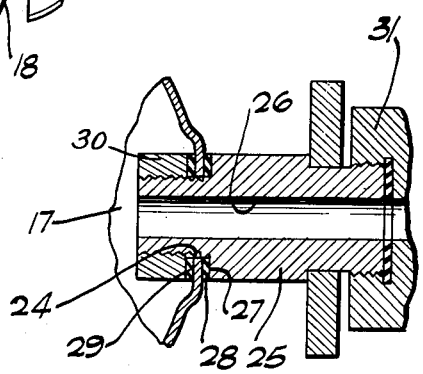
INVENTOR.
ALBERT E. ROCKEY.
BY
*Thos L Donnelly*
ATTORNEY.

United States Patent Office 2,756,974
Patented July 31, 1956

2,756,974

BEVERAGE MIXER

Albert E. Rockey, Detroit, Mich.

Application April 27, 1953, Serial No. 351,353

2 Claims. (Cl. 259—110)

My invention relates to a new and useful improvement in a beverage mixer adaptable for mixing various types of beverages. It is particularly adapted for mixing beverages such as chocolate, instant coffee, etc.

It is an object of the present invention to provide a mixer of this class which will be simple in structure, economical of manufacture, durable, compact, easily operated and highly efficient in use.

It is another object of the invention to provide a beverage mixer having a conduit communicating therewith by which liquid may be passed into a receptacle and in which receptacle a mixing element is mounted.

Another object of the invention is the provision of a mixer of this class having a receptacle so arranged that it may be swung to upright and swung to horizontal or downward position for discharging liquid therefrom.

Other objects will appear hereinafter.

It is recognized that various modifications and changes may be made in the detail of structure illustrated without departing from the invention and it is intended that the present disclosure shall be considered to be but the preferred embodiment.

Forming a part of this application are drawings in which,

Fig. 1 is a top plan view of the invention,

Fig. 2 is an elevational view of the invention,

Fig. 3 is a fragmentary elevational view of the invention with parts broken away, Fig. 4 is a fragmentary sectional view, slightly enlarged, taken on line 4—4 of Fig. 2, Fig. 5 is a fragmentary sectional view taken on line 5—5 of Fig. 2, slightly enlarged.

As shown in the drawings, a bracket 9, having outwardly projecting spaced apart legs 10 to 11, is mounted on a suitable support 12. Carried by the bracket leg 11 is an electric motor 13 for driving the shaft 14. This shaft passes into a coupling 15 and is connected to the shaft 16. This shaft 16 extends into the interior of the receptacle or container 17 which is cup-shaped and open at one end. A fitting 18 is threaded into an exterior fitting 19 which carries a flexible sealing washer 20. The fitting 18 threaded into fitting 19 serves to clamp the sealing washers 21 and 22 against opposite sides of the receptacle so that leakage of liquid from the receptacle at this point cannot take place.

Fixedly mounted on the end of the shaft 16 is a mixer embodying the mixing blades 23 so that when the shaft 16 is rotated the liquid deposited in the receptacle 17 will be agitated and thoroughly mixed.

Diametrically opposite shaft 16 there is formed in the wall of the receptacle 17 an opening 24 and projected through this opening is a fitting 25 having the passage 26 formed therethrough, and provided with a shoulder 27. This shoulder 27 bears against a sealing gasket 28.

The sealing gasket 29 is engaged by one face of the nut 30 threaded on the inner end of the fitting 25 so that the gaskets 28 and 29 prevent leakage of liquid from receptacle 17. Connected to the opposite end of the fitting 25 is a nut 31 which serves to connect the pipe 32 in communication with the passage 26. This pipe 32 extends from one end of the valve housing 33 with which communicates a flexible conduit 34, the valve being operable by the handle 35. This conduit 34 leads from a suitable source of liquid such as a tank of hot water, milk or the like.

When it is desired to use the mechanism, chocolate, coffee or the like is deposited in the receptacle 17 and the valve is opened to permit flow of hot water or liquid into the receptacle, the operator determining the proper amount to be deposited in the receptacle 17. The motor is then turned on so that a thorough mixing of the liquid and deposited material may be effected. When the proper mixing has been accomplished the receptacle 17 may then be tilted downwardly at its upper end, against the tension of the spring 36 which is connected at one end to the receptacle 17 and its opposite end to the bracket 9. In this manner the contents may be emptied into a glass, cup or the like.

Projected outwardly from the bracket 9 is an abutment arm 37 one end of which is adapted to engage the receptacle 17 when it is restored to its normal or upright position by means of the tension of the spring 36. In the rocking movement of this receptacle 17 the fitting 25 will rotate with it and the receptacle will also rotate on the shaft 16 as an axis.

Experience has shown that a beverage mixer of this class is highly efficient in use and particularly useful in mixing hot drinks such as coffee or hot chocolate. The mixing may be easily and quickly accomplished and the pouring of the hot mixed liquid into a cup or glass may be accomplished without discomfort to the operator.

What I claim is:

1. A mixing device of the class described, comprising a cup-shaped receptacle open at one end for the reception of liquid; a mixing element in said receptacle; a rotatable shaft connected to said mixing element and projected through one side of said receptacle; means for rotating said shaft; a supporting member engaging the opposite side of said receptacle diametrically opposite said shaft with its axis in alignment with said shaft, said receptacle being rockable on said shaft and on said supporting member; a supporting bracket having a pair of spaced apart arms, one of said arms supporting said shaft and the other of said supporting arms supporting said supporting member; and a spring connected at one end to said bracket and at the opposite end to said receptacle for normally resisting rocking movement of said receptacle in one direction and retaining said receptacle positioned with its open end upward.

2. A mixing device of the class described, comprising a cup-shaped receptacle open at one end for the reception of liquid; a mixing element in said receptacle; a rotatable shaft connected to said mixing element and projected through one side of said receptacle; means for rotating said shaft; a supporting member engaging the opposite side of said receptacle diametrically opposite said shaft with its axis in alignment with said shaft, said receptacle being rockable on said shaft and on said supporting member; a supporting bracket having a pair of spaced apart arms, one of said arms supporting said shaft and the other of said supporting arms supporting said supporting member; a spring connected at one end to said bracket and at the opposite end to said receptacle for normally resisting rocking movement of said receptacle in one direction and retaining said receptacle positioned with its open end upward; and an abutment member secured at one end to said bracket and projecting outwardly therefrom for engaging said receptacle and limiting the upward swinging of the same in response to said spring to a pre-determined position, said receptacle being swingable through less than 180°.

References Cited in the file of this patent

UNITED STATES PATENTS

| | | |
|---|---|---|
| 1,490,617 | McKillican | Apr. 15, 1924 |
| 1,898,365 | Harding | Feb. 21, 1933 |
| 2,618,471 | Weigham et al. | Nov. 18, 1952 |

FOREIGN PATENTS

| | | |
|---|---|---|
| 315,770 | Great Britain | June 19, 1930 |